United States Patent Office 3,631,227
Patented Dec. 28, 1971

3,631,227
HALOCYCLOHEXANONE CONVERSION TO
CATECHOL DIACETATE
Mahmoud S. Kablaoui, Wappingers Falls, and Harry
Chafetz, Poughkeepsie, N.Y., assignors to Texaco Inc.,
New York, N.Y.
No Drawing. Filed Feb. 27, 1970, Ser. No. 15,295
Int. Cl. C08c 69/16
U.S. Cl. 260—479 R                    10 Claims

ABSTRACT OF THE DISCLOSURE

Method of preparing a catechol diacetate of the formula:

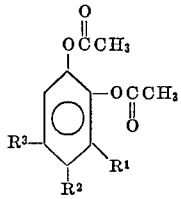

where $R^1$, $R^2$, and $R^3$ are hydrogen or alkyl comprising contacting a halocyclohexanone of the formula:

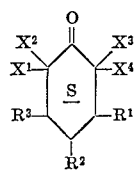

where $R^1$, $R^2$ and $R^3$ are as heretofore defined and $X^1$, $X^2$, $X^3$ and $X^4$ are hydrogen or halogen at least one of the X members being halogen with acetic anhydride in the presence of a catalytic amount of a substance selected from the group consisting of boron trifluoride etherate, pyridine, concentrated sulfuric acid and hydrochloric acid, subsequently contacting the resultant mixture with concentrated sulfuric acid.

BACKGROUND OF INVENTION

This invention relates to the preparation of alkylated and non-alkylated catechol diacetates. The catechol diacetate products contemplated herein are readily converted by established hydrolysis techniques to the corresponding nonalkylated and alkylated catechol. Catechol is a standard product in pharmaceutical manufacture and the alkylated catechols are useful as drilling mud dispersants.

In the past preparation of catechol compounds via aromatization of ketonic compounds has been disappointing, particularly in the area of obtaining satisfactory yields and reaction times. One prior method called for contacting cyclohexadiones with a palladium on carbon catalyst and another similar procedure utilized Raney nickel and sodium hydroxide as catalyst. Still another method first chlorinates phenol, separates the ortho isomer, and treats it with caustic at high temperatures in the presence of metal complexing agent such as $Ba(OH)_2$, $CuCl_2$, $Pd(OAc)_2$ to complex the product and prevent it from further reacting. The metal complexes are converted to the metal oxides which are required to be regenerated for use. The metal complexing agents are essential, expensive and are used in molar ratios with the chlorophenol.

DESCRIPTION OF THE INVENTION

We have discovered and this constitutes our invention a method of converting a halocyclohexanone or alkylated halocyclohexanone in relatively good yields into corresponding catechol diacetates and alkylated catechol diacetate. The process is relatively rapid, highly selective under preferred conditions and accompanied by ease of isolation of the diacetate product. Further, with negligible loss, the diacetate product can be readily converted into the corresponding catechol and alkylated catechols via standard hydrolysis techniques.

Specifically, a catechol diacetate of the general formula:

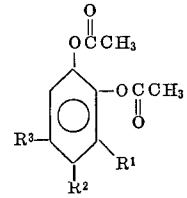

where $R^1$, $R^2$ and $R^3$ are hydrogen or alkyl of from 1 to 20 carbons is prepared by first contacting a halocyclohexanone of the formula:

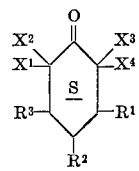

where $R^1$, $R^2$ and $R^3$ are as heretofore defined and $X^1$, $X^2$, $X^3$ and $X^4$ are hydrogen or halogen with acetic anhydride and a catalytic amount, i.e., between about 0.05 and 1 mole/mole of halocyclohexanone, preferably 0.1:1, of a substance selected from the group consisting of concentrated sulfuric acid, concentrated hydrochloric acid, pyridine and boron trifluoride etherate at a temperature between about 30 and 150° C., preferably between about 80 and 120° C., utilizing a mole ratio of said acetic anhydride to said halocyclohexanone of between about 1:1 and 10:1 or more (the excess acetic anhydride functioning as diluent), preferably between about 1:1 and 2:1, normally for between about 0.5 and 2 hours, preferably about 1 hour, subsequently second contacting the resultant first reaction mixture with a second concentrated sulfuric acid, utilizing a mole ratio of said second concentrated sulfuric acid to said halocyclohexanone of between about 1:0.1 and 1:3, preferably between 1:1 and 1:2, at a temperature between about 30 and 150° C., preferably between about 80 and 120° C., normally for a period of between about 0.5 and 12 hours, preferably between about 1 and 2 hours. Both the first and second contacting are advantageously conducted under conditions of agitation in order to facilitate ingredient reaction. In addition, they are also advantageously conducted in an inert gas atmosphere such as nitrogen.

The catechol diacetate product can be recovered from the resultant reaction mixture by standard means. One means of recovery comprises first removing the volatiles such as excess acetic anhydride via fractional distillation, quenching the residue at a temperature between about 0 and 30° C., with water wherein the water content in the resultant mixture is normally between about 2 and 75 wt. percent, extracting the aqueous mixture with a water immiscible volatilizable solvent for the catechol diacetate product, washing the solvent layer with an aqueous alkali base, e.g., 1 to 7 wt. percent sodium bicarbonate, subjecting the washed solvent to fractional distillation to remove the volatilizable solvent.

The conversion of the catechol diacetate product to the corresponding catechol derivatives can be accomplished as heretofore stated by established hydrolysis techniques such as contacting the catechol diacetate with an aqueous mineral acid, e.g., between about 0.1 and 1 wt. percent aq. hydrochloric acid, utilizing a catechol diacetate to aqueous acid weight ratio of between about 1:2 and 1:10 at a temperature between about 0 and 100° C., most preferably under reflux conditions, extracting the formed dihydroxybenzene from the aqueous acid solution with a water immiscible volatilizable solvent for the resultant catechol derivative, and separating the catechol derivative from the solvent in the manner outlined in respect to the recovery of the catechol diacetate. Alternatively, the catechol diacetate need not be isolated from the reaction mixture of the first stage reaction and after the distillation of the excess volatilizable diluent in the first stage such as acetic anhydride, an aqueous solution of mineral acid such as between 0.1 and 1 wt. percent aq. hydrochloric acid can be introduced in contact with the catechol diacetate residue of the first stage and the hydrolysis and recovery conducted as previously described.

By the term "concentrated sulfuric acid" hereinbefore and hereinafter recited a sulfuric acid composition consisting of between 95 and 100 wt. percent $H_2SO_4$ and 0 to 5 wt. percent $H_2O$ is intended.

In regard to critical features of the invention, elimination of any of the materials or step sequences as defined or quantity amounts either result in substantially reduced yields or no yields of desired catechol diacetate and/or catechol derivatives. For example, deletion of employment of catalyst in the first contacting results in a manifold decrease in yield of final diacetate product. Further, the elimination of sulfuric acid in the second contacting renders the process inoperative. Still further, optimum results depend on the particular combination of ingredients employed.

Suitable examples of diluent useful in the preparation of the catechol diacetates are excess acetic anhydride, acetic acid, xylene, toluene, benzene, heptane, hexane, carbon tetrachloride, chlorobenzene, cyclohexane, and mixtures thereof. Acetic acid is a particularly suitable diluent in combination with acetic anhydride since it has the added attribute of suppressing side reactions. Examples of acetic anhydride to acetic acid mole ratios are between about 0.5:1 and 5:1.

Examples of selective solvents for the diacetate and dihydroxybenzene products are ether, benzene, chloroform and carbon tetrachloride.

Examples of the halocyclohexanone reactants contemplated herein are 2-chlorocyclohexanone,
2,2-dichlorocyclohexanone,
2,6-dichlorocyclohexanone,
2,2,-dichloro-4-methylcyclohexanone,
2,6-dichloro-4-methylcyclohexanone,
2,2-dichloro-3-hexylcyclohexanone,
2,2-dichloro-3,4-dimethylcyclohexanone,
2,6-dibromo-3,4-didecylcyclohexanone and
2,6-diiodo-,3,4-didecylcyclohexanone.

The corresponding diacetate products formed are catechol diacetate, 4-methylcatechol diacetate, 3-methylcatechol diacetate and 3,4-didecylcatechol diacetate. Examples of the corresponding dihydroxy derivatives are catechol, 4-methylcatechol, 3-methylcatechol and 3,4-didecylcatechol.

The monohalocyclohexanone and dihalocyclohexanone reactants can be prepared by the following methods:

The monohalocyclohexanones may be prepared by contacting cyclohexanone, in the presence of water or acetic acid diluent wherein the diluent constitutes between about 1 and 50 wt. percent of the reaction mixture with free halogen, e.g., chlorine gas at a temperature between about 0 and 50° C., normally for a period of between about 0.2 and 1 hour, separating the water layer from the halogenated cyclohexanone organic layer, extracting the halocyclohexanone products with volatilizable diluent such as ether from the water layer and combining the organic and ether layers with the subsequent removal of ether leaving the halocyclohexanone product. The mole ratio of halogen to ketone reactant is advantageously maintained between about 1:1 and 1.1:1 in the halogenation.

The dihalocyclohexanones and alkyl dihalocyclohexanone reactant can be prepared in similar manner by halogenating cyclohexanone, alkylcyclohexanone and/or cyclohexanol, alkylcyclohexanol with free halogen utilizing acetic acid as diluent or water.

When acetic acid is employed, it is not necessary to separate the halogenated product from the reaction mixture and the halogenated mixture containing the halo- and dihalocyclohexanone can be utilized directly without intermediate purification in their conversion to the desired catechol diacetates.

The following examples further illustrate the invention but are not to be construed as limitations thereof.

Example I

This example illustrates a method of preparing a monochlorocyclohexanone reactant.

To a 500 mls., 3-necked flask equipped with a mechanical stirrer, a gas sparger, condenser and thermometer there were charged 150 mls. of distilled $H_2O$ and 50 grams of cyclohexanone. The temperature in the flask was maintained at 20–30° C. Thirty-eight grams of chlorine gas were bubbled into the solution over a 40-minute period. The organic layer was then separated and the water layer extracted with ether (4× 50 mls.). The combined organic and ether layers were dried and the solvent distilled to give 67 grams of residue. A gas chromatographic analysis of the residue showed the presence of 87% 2-chlorocyclohexanone, 4% of 2,2-dichlorocyclohexanone, 5 wt. percent of 2,6-dichlorocyclohexanone and 4 wt. percent of unreacted cyclohexanone.

Example II

This example illustrates the preparation of catechol diacetate from chlorocyclohexanone.

Into a 200 mls., 3-necked flask, equipped with a condenser magnetic stirrer, gas sparger and a thermometer there were charged 15 grams of the chlorinated product prepared in Example I, 75 mls. of acetic anhydride, 75 mls. of glacial acetic acid and 5 mls. of boron trifluoride etherate. The reaction was heated to reflux (118° C.) for 1 hour while dry nitrogen was passed therethrough at a rate of 140 mls./minute. The mixture was then cooled to 10–15° C. and 22 grams of concentrated (96 wt. percent) sulfuric acid was slowly added while maintaining the temperature in the above range. The reaction mixture was then heated to 100° C. for 2 hours. The residue was cooled and quenched in 200 mls. of ice water and extracted with 200 mls. of ether. The ether layer was washed with 100 mls. of 7 wt. percent aqueous sodium bicarbonate and dried. The thus treated residue weighing 20.3 grams and upon distillation gave 12.0 grams of distillate identified as catechol diacetate representing a yield of 54 wt. percent basis original ketone reactant.

Example III

This example illustrates the preparation of dichlorocyclohexanone.

A mixture of cyclohexanol (13 grams, 0.13 mole) and cyclohexanone (7 grams, 0.07 mole) was chlorinated in 100 mls. of water and 3 mls. of concentrated hydrochloric acid with chlorine gas (28 grams, 0.39 mole) at 20° C. to give 25.5 grams (96 wt. percent yield) of 2-chlorocyclohexanone. The residue was further chlorinated with chlorine gas (15 grams, 0.21 mole) at 20° C. in 75 mls. of acetic acid to give 31.2 grams of dichlorocyclohexanone representing a 95 wt. percent yield and consisting of 2,2-dichloro (81 wt. percent) and 2,6-dichlorocyclohexanone (19 wt. percent).

Example IV

This example illustrates the preparation of catechol diacetate from a dichlorocyclohexanone product.

Dichlorocyclohexanone product of the type prepared in Example III was charged to a dropping funnel connected to a flask containing acetic anhydride and an acylation catalyst and equipped with a condenser, thermometer and gas inlet tube. The solution in the flask was refluxed under nitrogen and the solution in the dropping funnel was added slowly. Reflux was continued for an additional period of time. In some cases both solutions were mixed together and refluxed. In either case the reaction mixture was cooled to about 10° C. and concentrated sulfuric acid was added slowly and the reaction mixture was refluxed for 2 hours. The residue was then cooled and worked up as in Example II. The thus treated residue was fractionally distilled and catechol diacetate was recovered. Several runs were made utilizing various catalysts and conditions. The test data and results are reported below in Table I:

TABLE I

| Run number | A | B | C |
|---|---|---|---|
| React. ingred.: | | | |
| Dichlorocyclohexanone, mmole | 28.5 | 28.5 | 122.3 |
| Acetic anhydride, ml | 50 | 50 | 100 |
| Acetic acid, ml | 50 | 50 | 100 |
| Conc. H₂SO₄, mmole | 30.6 | 30.6 | 132.6 |
| 1st stage acyl. cat., ml.: | | | |
| H₂SO₄ (conc.) | 0.3 | | |
| HCl | | 1 | |
| BF₃·Et₂O | | | 2 |
| 1st stage acyl. cond.: | | | |
| Temp., ° C | 118 | 118 | 118 |
| Time, hrs | 1 | 1 | 1 |
| 2nd stage aromatize cond.: | | | |
| Temp., ° C | 118 | 118 | 118 |
| Time, hrs | 2 | 2 | 2 |
| Yield, wt. percent: Catechol diacetate | 50 | 50 | 81 |

Example V

This example illustrates the conversion of alkyl cyclohexanone into a dichloroalkylcyclohexanone which in turn is converted into alkyl catechol from which is derived a methylcatechol derivative.

Into a 500 mls. 3-necked flask equipped with a mechanical stirrer, a gas sparger, a condenser and a thermometer, there were charged 100 mls. of glacial acetic acid, 13.2 grams of 3-methylcyclohexanone and 6.8 grams of 4-methylcyclohexanone. Chlorine gas (28.6 grams) was slowly bubbled through the solution at 20–30° C. over a 40-minute period while dry nitrogen was passed over the solution at a rate of 140 mls./minute.

After chlorination was complete 125 mls. of acetic anhydride and 5 grams of pyridine were added to the reaction mixture which was refluxed (118° C.) for 1 hour. The mixture was then cooled to 10–15° C. and 30 grams of concentrated (96 wt. percent) sulfuric acid was added slowly while maintaining the above temperature range. The reaction mixture was then refluxed (118° C.) for 2 hours.

The excess solvent (acetic anhydride and acetic acid) was distilled under reduced pressure (100 mm. Hg). The residue weighed 23.9 grams and was identified as a mixture of 4-methylcatechol diacetate and m,p-cresols and chloro-m,p-cresol acetates. Then 300 mls. water and 10 mls. concentrated (40 wt. percent) hydrochloric acid were added and the mixture refluxed for 2 hours followed by steam distillation. The distillate was extracted with ether and cresols and chlorocresols were isolated. The residue was also extracted with 4–50 mls. of ether to isolate 4-methylcatechol in an amount of 8.5 grams representing a yield of 40 wt. percent basis original ketone reactant.

We claim:

1. A method of preparing a catechol diacetate of the formula:

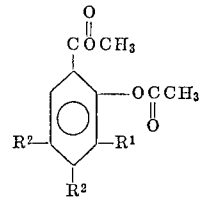

where $R^1$, $R^2$ and $R^3$ are hydrogen or alkyl of from 1 to 20 carbons, comprising first contacting a halocyclohexanone of the formula:

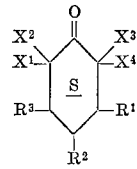

where $R^1$, $R^2$ and $R^3$ are as heretofore defined and $X^1$, $X^2$, $X^3$ and $X^4$ are hydrogen or a halogen radical and at least one of the X group being halogen with a mixture of acetic anhydride and catalytic amount of a substance selected from the group consisting of concentrated sulfuric acid, concentrated hydrochloric acid, pyridine and boron trifluoride etherate, said catalytic amount comprising between about 0.05 and 0.1 mole/mole of said halocyclohexanone, at a temperature between about 30 and 150° C., said acetic anhydride to said cyclohexanone mole ratio of at least about 1:1, subsequently second contacting the resultant first reaction mixture with concentrated sulfuric acid utilizing a sulfuric acid to said halocyclohexanone mole ratio of between about 1:0.1 and 3:1 at a temperature between about 30 and 150° C., and recovering said catechol diacetate product from the resultant second reaction mixture.

2. A method in accordance with claim 1 wherein said first and second contacting are conducted in the presence of an inert gas atmosphere and said halogen is chlorine.

3. A method in accordance with claim 2 wherein said catalytic substance is boron trifluoride etherate.

4. A method in accordance with claim 3 wherein said first and second contacting are conducted in the presence of acetic acid in a mole ratio of acetic acid to acetic anhydride of between about 1:0.5 and 1:5.

5. A method in accordance with claim 4 wherein said halocyclohexanone is 2-chlorocyclohexanone and said diacetate is catechol diacetate.

6. A method in accordance with claim 2 wherein said halocyclohexanone is a mixture of 2,2-dichlorocyclohexanone and 2,6-dichlorocyclohexanone and said diacetate is catechol diacetate.

7. A method in accordance with claim 2 wherein said cyclohexanone is a mixture of 3-methylcyclohexanone and 4-methylcyclohexanone, said catalytic substance is pyridine and said acetate is 4-methylcatechol diacetate.

8. A method in accordance with claim 5 wherein said 2-chlorocyclohexanone is prepared by contacting cyclohexanone with chlorine gas in a mole ratio of said cyclohexanone to chlorine of between about 1:1 and 1:1.1 at a temperature between about 0 and 50° C.

9. A method in accordance with claim 6 wherein said mixture is prepared by contacting cyclohexanone with a first chlorine gas in 10 wt. percent aqueous hydrochloric acid utilizing a mole ratio of said cyclohexanone to said first chlorine of between about 1:1 and 1:1.1 and to produce a 2-chlorocyclohexanone product, recovering said 2-chlorocyclohexanone product and contacting said product with a second chlorine gas in the presence of acetic acid to form said mixture utilizing a mole ratio of said 2-chlorocyclohexanone product to said second chlorine of between about 1:1 and 1:1.1, said acetic acid being present in an amount of between about 2 and 50 wt. percent of the second chlorination mixture.

10. A method in accordance with claim 7 wherein said methylcyclohexanone is contacted with chlorine gas in the presence of acetic acid, utilizing a mole ratio of said cyclohexanone to said chlorine of between about 1:2 and 1:2.5, said acetic acid being present in an amount of between about 2 and 50 wt. percent of the chlorination mixture, said contacting conducted at a temperature of between about 0 and 50° C.

References Cited

Doering et al.: J. Am. Chem. Soc., vol. 71, pp. 2221–6 (1949).

JAMES A. PATTEN, Primary Examiner

U.S. Cl. X.R.

260—621 G, 625